(12) United States Patent
Begel

(10) Patent No.: US 8,155,967 B2
(45) Date of Patent: Apr. 10, 2012

(54) METHOD AND SYSTEM TO IDENTIFY, QUANTIFY, AND DISPLAY ACOUSTIC TRANSFORMATIONAL STRUCTURES IN SPEECH

(76) Inventor: Daniel M. Begel, Pacific Palisades, CA (US)

(*) Notice: Subject to any disclaimer, the term of this patent is extended or adjusted under 35 U.S.C. 154(b) by 673 days.

(21) Appl. No.: 12/330,377

(22) Filed: Dec. 8, 2008

(65) Prior Publication Data

US 2010/0145681 A1 Jun. 10, 2010

(51) Int. Cl.
*G10L 21/06* (2006.01)
(52) U.S. Cl. .................................................. 704/270
(58) Field of Classification Search ............ 704/270
See application file for complete search history.

(56) References Cited

U.S. PATENT DOCUMENTS

| | | | |
|---|---|---|---|
| 7,280,968 B2 | 10/2007 | Blass | |
| 7,337,107 B2 | 2/2008 | Rose | |
| 7,337,114 B2 | 2/2008 | Eide | |
| 7,978,887 B2 * | 7/2011 | Mundy et al. | 382/128 |

OTHER PUBLICATIONS

Scherer, K., "Vocal communication of emotion: a review of research paradigms," Speech Communication, vol. 40, pp. 227-256, 2003, Elsevier, Amsterdam, The Netherlands.
Nilsonne, A., "Measuring the rate of change of voice fundamental frequency in fluent speech during mental depression," Journal of the Acoustical Society of America, vol. 83, No. 2, pp. 716-728, 1988, Acoustical Society of America, Melville, NY, US.

* cited by examiner

*Primary Examiner* — Susan McFadden

(57) ABSTRACT

The invention for processing speech that is described herein measures the simultaneous periodic changes of multiple acoustic features in a digitized utterance without regard for lexical, sublexical, or prosodic elements. These measurements of periodic, simultaneous changes of multiple acoustic features represent transformational structures contained in speech. Various types of transformational structures are identified, quantified, and displayed by the invention. The invention is useful for the study of such speaker characteristics as cognitive, emotional, linguistic, and behavioral functioning, and may be employed in the study of other phenomena of interest to the user.

24 Claims, 14 Drawing Sheets

METHOD AND SYSTEM TO IDENTIFY, QUANTIFY, AND DISPLAY ACOUSTIC TRANSFORMATIONAL STRUCTURES IN SPEECH

FIELD OF THE INVENTION

The invention relates to the digital signal processing of speech. More specifically, the invention relates to the identification, quantification and display of acoustic transformational structures.

BACKGROUND

It has long been known that information regarding the psychological characteristics of an individual may be carried in the acoustic signal of that individual's speech (K. Scherer, "Vocal communication of emotion: a review of research paradigms," Speech Communication, volume 40, pp. 227-256, 2003). Speech itself, moreover, has been understood as a product of linguistic transformational structures employed by the individual speaker (J. Piaget, Structuralism, Basic Books, 1970, pp. 5, 10, 15; R.Jakobson, Studies on Child Language and Aphasia, Mouton, 1971, pp. 7, 12, 20). Studies of psychoacoustics, however, have neglected to examine the continuous and simultaneous changes of multiple features of the acoustic signal, the acoustic transformational structures, that are generated by an individual in the act of speaking. Acoustic correlates of depressive states, for example, have been sought in summary statistics of a single specific acoustic feature, such as the mean rate of change of the fundamental frequency (Mn delta F0) of an utterance, without regard to the behavior of other acoustic features that accompany F0 in the acoustic signal (A. Nilsonne, "Measuring the rate of change of voice fundamental frequency in fluent speech during mental depression," Journal of the Acoustical Society of America, volume 83, number 2, pp. 716-728, 1988). Where several features are considered, weighted correlations with targeted mental states are derived from features considered independently rather than features contained in whole stuctures rendered by simultaneous feature values determined at identical analysis windows (K. Scherer, ibid.). These approaches fail to track the simultaneous variability of multiple acoustic features that distinguish any utterance, the acoustic transformational structures, and they therefore limit the observational scope for identifying specific feature-generating characteristics of the speaker. The result is an inadequate correlation of acoustic measurements with psychological characteristics (K. Scherer, ibid.).

In contrast to these methods, some techniques of acoustic analysis that are utilized in systems of speech recognition, speech synthesis, and emotion detection measure a variety of acoustic features at periodic intervals and compute the variability of multiple features. These computations, however, are incorporated with other, heterogeneous measurements into feature vectors that are then associated statistically with acoustic data that is selected and classified according to specific elements of speech content, such as specific phrases, words, morphemes, phonemes, diphones, prosodic features, or other distinctive elements (e.g. U.S. Pat. No. 7,337,114, Eide, Feb. 26, 2008; U.S. Pat. No. 7,337,107, Rose, Feb. 26, 2008; U.S. Pat. No. 7,280,968, Blass, Oct. 9, 2007; U.S. Pat. No. 6,173,260, Slaney, Jan. 9, 2001). These conglomerate vectors associated with specific linguistic elements do not constitute transformational structures, and, as a result, they are inadequate for identifying qualities, such as psychological qualities, that are intrinsic to the individual and prevail over the course of an utterance regardless of content.

What is needed is a method and system for rendering the simultaneous variability of multiple acoustic features generated in the course of an utterance that are independent of the specific content of that utterance. That is, what is needed is a method and system for rendering the acoustic transformational structures employed by the speaker. What is needed, further, is a method and system to describe and display these measurements in a manner that facilitates the elucidation of speaker characteristics.

SUMMARY OF THE INVENTION

The invention is a method and system for processing a digitized acoustic signal of an utterance to identify, quantify, and display various acoustic transformational structures of that utterance. It is also a non-transitory computer readable medium containing instructions for implementing the method and system.

The structures identified, quantified, and displayed by the invention represent simultaneous transitions of multiple acoustic features. The invention computes these transitions at periodic intervals over the entire utterance or over temporal units of the utterance, without regard to the content of the utterance.

In operation, feature values are first computed at equal periodic intervals of the acoustic signal. Features whose values are computed may include, but are not limited by the invention to, pitch, intensity, formant frequencies and formant bandwidths. In the embodiments discussed below, the interval period ranges from 1-50 milliseconds, though other interval periods may be selected. The invention removes computations of feature values that derive from non-spoken portions of the acoustic signal. The invention computes first-order transitions, which are differences between successive extracted feature values. In the embodiments discussed below, differences between successive frequency values are normalized, though other means of computing frequency differences may be implemented. The invention computes second-order transitions of feature values, which are the differences between successive first-order transitions. Computations that derive from phonated portions of the utterance are identified, and computations that derive from unphonated portions of the utterance are also identified.

The above steps yield a variety of feature vectors. For each acoustic feature there will be six vectors, consisting of computations of successive first- and second-order transitions for phonated, unphonated, and whole speech, respectively. These six vectors are computed for the entire utterance as well as for temporal units of the utterance. In an embodiment discussed below, the temporal units range from 0.5-2.0 seconds, though other units may be selected. Also in an embodiment discussed below, the array of resulting vectors is cataloged for subsequent retrieval.

The invention renders a transformational structure or substructure by juxtaposing two or more vectors that are identical for transition order and phonation status, and non-identical for acoustic features. These composite vectors are drawn from either the same temporal unit or from the entire utterance.

The invention partitions a transformational structure or substructure so rendered. The structure or substructure is divided into a plurality of equivalent neighborhoods and the density of data points contained in each neighborhood is computed. A threshold density is selected, and those neighborhoods containing a density of data points greater than the threshold are distinguished from those neighborhoods containing a density of data points less than the threshold. The data points contained in these two sets of neighborhoods comprise two partitioned structures.

This partitioning of structures by the invention enables a user of the invention to distinguish those acoustic transformations that the speaker performs most often from those acoustic transformations that the speaker performs less often. This distinction is dependent on the computing of transitions of multiple acoustic features simultaneously and also on the computing of neighborhoods which these simultaneous transitions inhabit. The distinction between most often and less often transitions is independent of lexical elements and reflective of speaker characteristics. In the description below an example will be given of how this novel aspect of the invention may be applied.

The invention quantifies a structure, substructure, or partitioned structure. Statistics descriptive of the distribution of computations pertaining to each acoustic feature represented by the structure are calculated. These descriptive statistics may include, but are not limited by the invention to, the means, standard deviations, skews, and kurtoses. In addition, the covariance of computations pertaining to each pair of acoustic features is calculated. A fragmentation index and a scattering index are calculated. These calculations are displayed by the system of the invention.

The system of the invention also displays as an image a representation of structures, substructures, or partitioned structures. Two feature images of successive temporal units may be displayed as a movie, at a rate corresponding to the rate of the temporal units in the digitized utterance. In this case, the images are identical with respect to transition status, phonation status, and partitioning. Structures consisting of two acoustic features are displayed in a manner that reveals the relative densities of equivalent neighborhoods.

The invention includes a non-transitory computer readable media with instructions for executing the above method and system.

BRIEF DESCRIPTION OF THE DRAWINGS

The invention is described below with reference to the accompanying drawings. The drawings are intended to provide a succinct and readily understood schematic account of the invention. In this regard, no attempt is made to show structural or procedural details in more detail than is necessary for a fundamental understanding of the elements of invention. The detailed description taken in conjunction with the drawings will make apparent to those persons of ordinary skill in the art how the invention may be embodied in practice.

FIG. 9b. An image of the greater-than-threshold partitioned structure derived from the unpartitioned structure of FIG. 9a.

FIG. 9c. An image of the less-than-threshold partitioned structure derived from the unpartitioned structure of FIG. 9a.

DETAILED DESCRIPTION OF THE INVENTION

Figure 1:
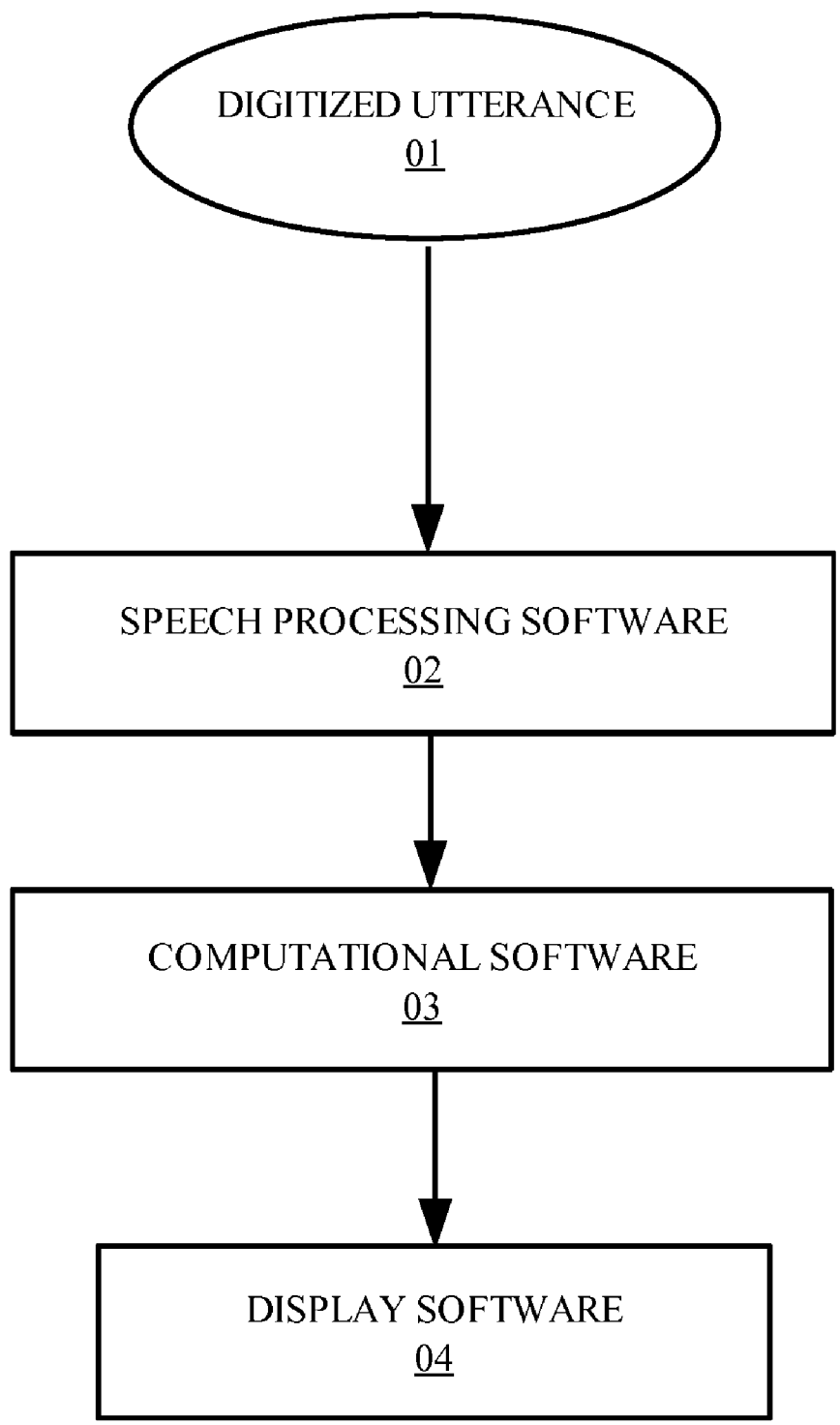
FIG. 1. A schematic diagram of the software architecture.

The invention is a method and system for processing a digitized acoustic signal of an utterance to identify, quantify, and display various acoustic transformational structures of that utterance. The structures identified, quantified, and displayed by the invention represent simultaneous transitions of multiple acoustic features over the course of an utterance without regard to lexical, sublexical, or prosodic content. The utterance may be of any length determined by the user. In the example described below, utterances of approximately 20 seconds are processed. Acoustic features of interest may include pitch, intensity, formant bandwidths, formant frequencies, cepstral coefficients, pitch modulations, intensity modulations, signal-to-noise ratios, or any other feature that is possible to compute from a digitized acoustic signal of speech. The possible features of interest shall not be construed as limited to those specified in this description.

The invention computes transitions in feature values at periodic intervals over the entire utterance or over temporal units of the utterance, without regard for lexical, sublexical, or prosodic aspects. The natural act of speaking entails the generating of acoustic energy whose various features undergo simultaneous modification, rather than modification separately, and the invention provides a method for quantifying how these acoustic features change in relationship to one another in the course of a human utterance. The invention provides a method and system for quantifying and displaying the acoustic structures it identifies, enabling it to be used for elucidating a variety of speaker characteristics such as cognition, emotion, and behavior, including linguistic behavior, or any other characteristics of interest to the person using the invention. An example of how the invention may be used is provided below. The invention is also a non-transitory computer readable medium containing instructions for implementing the method and system of the invention.

It should be appreciated that the present invention can be implemented in numerous ways, including as a process, an apparatus, a system, or a non-transitory computer readable medium such as a computer readable storage medium or a computer network wherein program instructions are sent over optical or electronic communication links. It should be noted that the described order of the steps of the disclosed method and system may be altered within the scope of the invention. The embodiments described below are to be understood as examples only, and are not to be construed as limiting the potential embodiments or applications of the invention, nor as narrowing the scope of CLAIMS.

In addition, the specific terminology used in this specification is for descriptive purposes only, and shall not be construed as excluding from the scope of this invention similar methods and systems described by different terms. Citation of specific software programs or hardware devices employed in the embodiments of the invention shall not be construed as excluding from the scope of the invention software programs, hardware devices, or any other technical means that a person skilled in the art may find appropriate for fulfilling the functions of the invention. Command listings included in this specification shall not be construed as excluding from the scope of the invention other command listings known to or devised by persons skilled in the art which may fulfill the functions of the invention.

Figure 2:
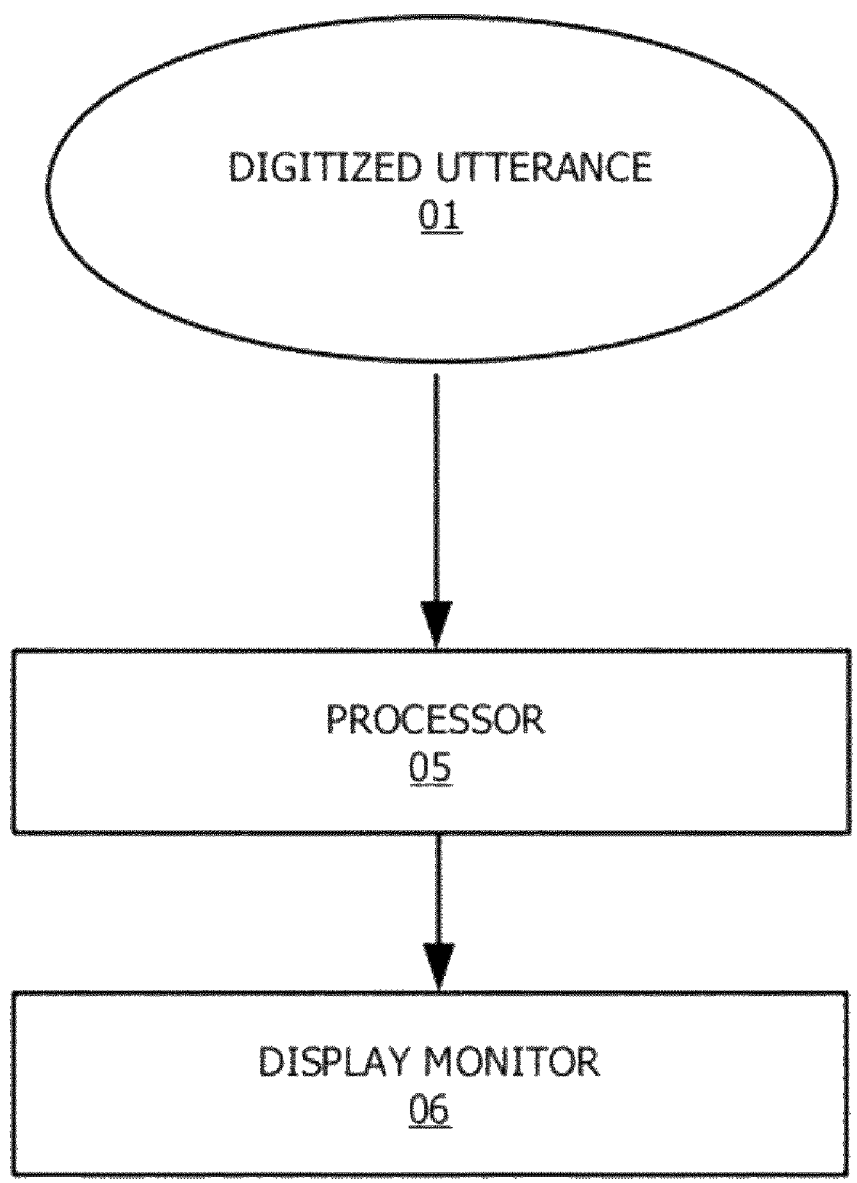
FIG. 2. A schematic diagram of the hardware architecture.

The digitized utterance FIG. 1, ELEMENT 01, to be processed may be received by the processor FIG. 2, ELEMENT 05, in various ways. In one embodiment of the invention it is recorded and digitized using an external audio interface device and imported to the processor 05 by USB cable. In another embodiment it is submitted by an electronic communication link. In another embodiment it is recorded and digitized using speech processing software FIG. 1, ELEMENT 02 loaded onto the processor 05, which contains an internal sound card. These and other methods for receiving a digitized utterance are familiar to persons of ordinary skill in the art. They may be accomplished using a general purpose computer and, if required, a general purpose audio interface and general purpose speech processing software.

Figure 3:
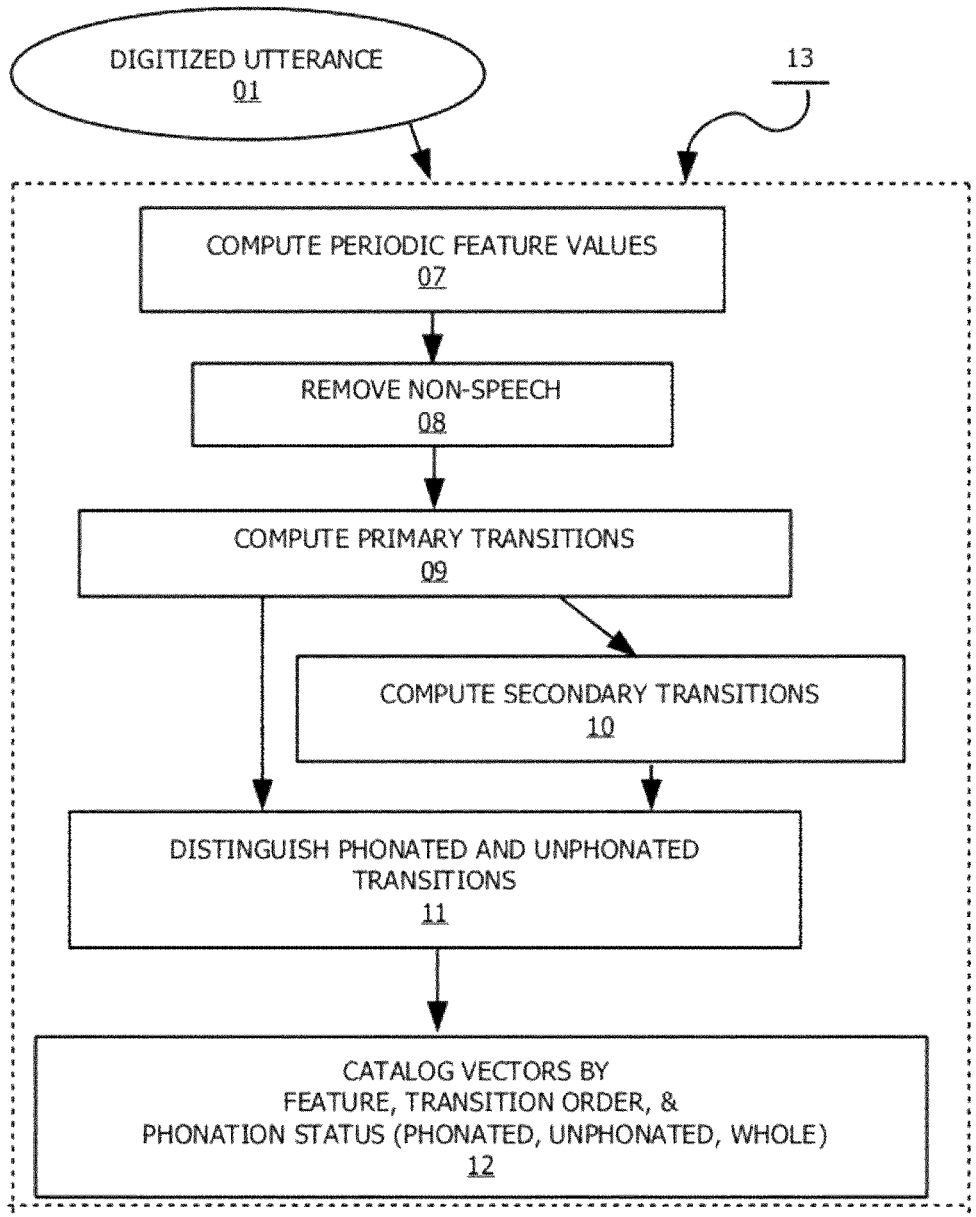
FIG. 3. A flowchart of steps for computing and cataloging feature vectors for subsequent use in the composing of structures and substructures.

The computation of periodic feature values FIG. 3, STEP 07, is accomplished using speech processing software FIG. 1, ELEMENT 02, capable of computing the specific features of interest. In one embodiment, commercially available software is employed for this purpose. The Praat, version 4.6.06, copyright 1992 by Paul Boersma and David Weenink, a widely used speech processing software, is suitable for this purpose. Other embodiments may employ other commercially available software, non-commercial software, or software algorithms designed by persons skilled in the art.

In one embodiment the acoustic features of interest include pitch, intensity, frequencies of the first four formants, and bandwidths of the first four formants. Other embodiments may compute values for other features such as shimmer, jitter, and cepstral coefficients. Any feature that can be computed from a digitized acoustic signal of speech is suitable for processing by the invention.

Feature values are computed at regular periodic intervals, STEP 07. In one embodiment the interval is 10 ms, which is long enough to discern meaningful transitions but not so long as to blur structural detail. Other embodiments may employ different intervals within a range of 1-50 ms, while intervals outside this range may be selected in still other embodiments according to the interest of the user.

In one embodiment, executed in Praat, the first four formant frequencies are calculated by reference to a selected maximum formant value. In this embodiment the maximum formant value is defined relative to the mean pitch of the utterance:

if mean pitch<=120 Hz, maximum formant frequency=5000 Hz, if 120 Hz<mean pitch<=140 Hz, maximum formant frequency=5250 Hz, and if mean pitch>Hz140, maximum formant frequency=5500 Hz.

In this embodiment, pitch values, intensity values, and first four formant bandwidth values are also computed at periodic intervals of 10 ms using the algorithms of Praat. In other embodiments, the same features may be computed using algorithms preferred by the user, or other features may be computed using algorithms contained in specific software or algorithms preferred by the user.

The computed periodic feature values are then processed using computational software FIG. 1, ELEMENT 03. In one embodiment, commercially available software for general scientific use, such as Matlab, version 7.4.0, copyright 1984-2007 by The Mathworks, Inc., is used for the purpose. In other embodiments, other commercial or non-commercial software designed for general scientific use may be employed, or a user skilled in the art may prefer self-designed algorithms.

In one embodiment, vectors representing computations of feature values are arranged as an m×n matrix for ease of processing. In this embodiment, the columns n correspond to acoustic features and the rows m correspond to the calculated feature values at periodic intervals.

Computations deriving from non-speech portions of the acoustic signal are removed FIG. 3, STEP 08. In one embodiment this may be accomplished by including an intensity measure among the acoustic features, and estimating an intensity minimum below which the acoustic signal reflects the acoustics of the system devoid of speech. Computations associated with intensity values below this estimated minimum are then removed in a manner known to persons of ordinary skill in the art. In the Praat, an estimate of a speech intensity minimum may be accomplished by inspecting an intensity contour of the utterance as it is played and estimating visually the level below which acoustic energy appears to be a product of the recording system and ambient energy rather than speech. In another embodiment, a system designed to distinguish speech in a noisy environment is used to, distinguish spoken from non-spoken acoustic energy.

Removing computations associated with non-speech will leave implied holes in feature vectors, in which computations preceding and succeeding these holes will represent discontinuous portions of the original utterance. In one embodiment, those computations sitting on the border of speech and non-speech are tagged with an easily identifiable dummy value for later removal.

The invention computes first-order, or primary, transitions, or the differences between succeeding periodic measurements of each of the acoustic features of interest, FIG. 3, STEP 09. In one embodiment, intensity differences, expressed in dB, are computed by simple subtraction of value at row i+1 from row i, where i=1:m and m=number of rows. In this embodiment, first-order transitions for pitch, formant frequencies, and formant bandwidths are calculated relatively, such that the difference, d, equals $(f(i+1)-f(i))/f(i)$, or $(f(i+1)/f(i))-1$. In unphonated speech, the pitch value=0, and in order that the frequency calculation circumvent a step of dividing by zero, a dummy value is temporarily substituted for values of pitch=0. After the calculations of first- and second-order frequency transitions the resulting dummy value is replaced by 0. In another embodiment, frequency transitions are normalized by taking the difference between initial and final frequency values of the periodic interval and dividing this by a calculated mean frequency of the interval.

In a similar manner to the calculation of first-order transitions, second-order, or secondary, transitions, constituting the rate of change of computed acoustic features in the utterance, are calculated FIG. 3, STEP 10, by taking the differences between succeeding calculations of the first-order transitions. In one embodiment, second-order transitions of frequency values are computed by simple subtraction of succeeding first-order transitions.

Primary and secondary transitions that derive from phonated and unphonated portions of the utterance are then distinguished, FIG. 3, STEP 11. In one embodiment, computations derived from unphonated speech are identified by their having, within their feature value vectors, intensity values greater than the estimated intensity minimum for speech, along with a pitch value=0. In one embodiment, primary and secondary transitions associated with these measurements of unphonated speech are sequestered, leaving calculations of primary and secondary transitions that derive from phonated speech as a remaining entity.

STEPS 07-11, FIG. 3, enable the invention to catalog feature vectors into an indexed cell array defined by transition order, acoustic feature, and phonation status (phonated, unphonated, or whole) FIG. 3, STEP 12. For example, if feature values of five acoustic features are measured, and if the features are pitch, intensity, first formant frequency, first formant bandwidth, and second formant frequency the catalog is expressed as:

catalog={[pd,id,f1d,f1bwd,f2d];
[pd2,id2,f1d2, f1bwd2,f2d2];
[phonpd,phonid,phonf1d,phonf1bwd,phonf2d];
[phonpd2,phonid2,phonf1d2,phonf1bwd2,phonf2d2];
[unphonpd,unphonid,unphonf1d,unphonf1bwd, unphonf2d];
[unphonpd2,unphonid2,unphonf1d2,unphonf1bwd2, unphonf2d2]};

where p=pitch, i=intensity, f followed by number=numbered formant frequency, f followed by number and bw=numbered formant bandwidth, d=first order transition, d2=second order transition, phon=computations derived from phonated speech, and unphon=computations derived from unphonated speech.

This indexed catalog facilitates the selection of acoustic feature values in their transition status and phonation status for rendering specific structures and substructures.

The STEPS 07-12 shown in FIG. 3 that constitute the computing and the cataloging of vectors by feature, transition status, and phonation status are collectively labelled STEP 13.

Figure 4:
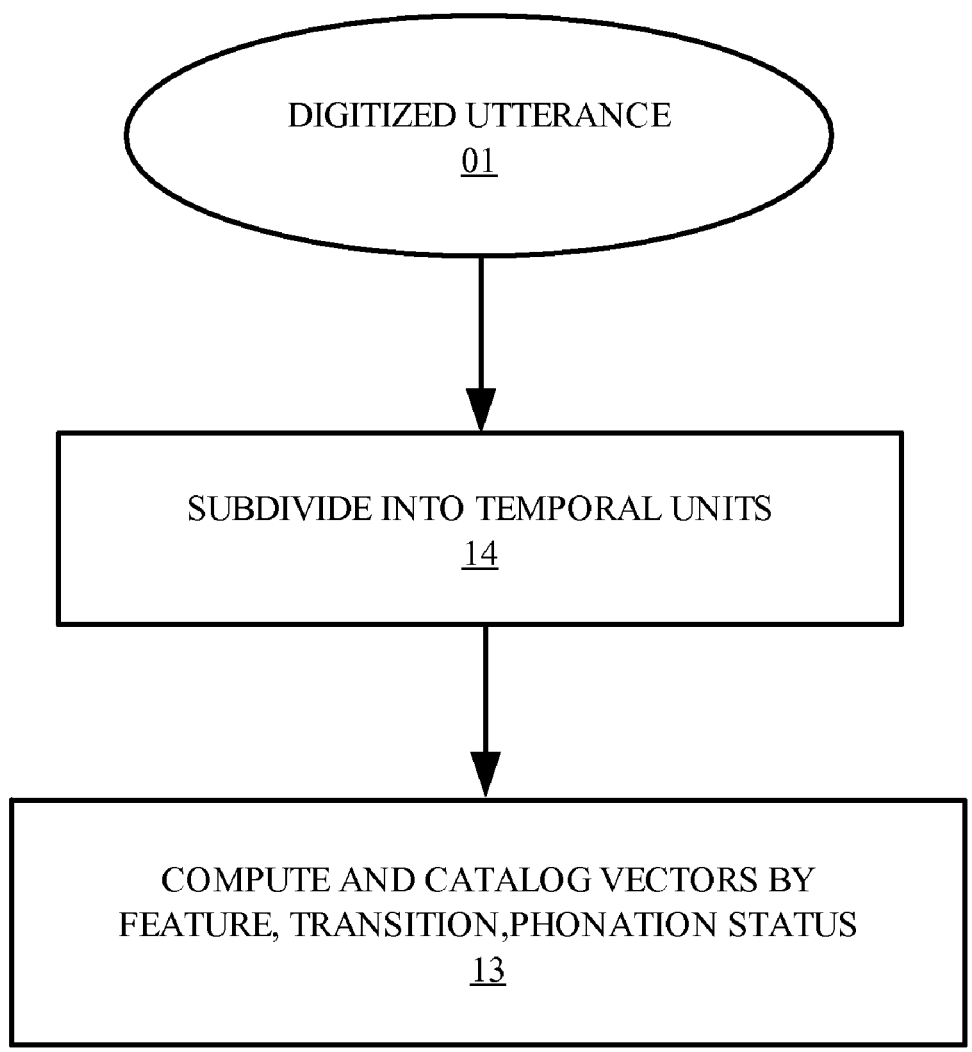
FIG. 4. A flowchart of steps for computing and cataloging feature vectors of temporal units.

The invention implements STEP 13 for temporal units of an utterance as well as for the utterance as a whole. In order to apply STEP 13 to temporal units of the utterance, the intitial group of measurements of feature values at equal periodic intervals FIG. 3, STEP 07, is first divided into temporal units, all of which, except for the last unit, are of equal duration FIG. 4, STEP 14. In one embodiment, this step is executed by selecting a duration, s, in seconds, for the desired temporal unit, multiplying by 1000, and dividing by the period interval, in milliseconds, at which feature values are calculated, to yield the number of rows of the feature measurements contained in each temporal unit:

unit=$s*(1000/\text{period interval})$ rows.

In this embodiment, if the feature vector contains R rows, and k complete temporal units, the last unit will consist of R−(k*unit) rows. Computations of feature values for each temporal unit are then processed by STEP 13, resulting in a catalog of temporal unit feature vectors classified by feature, transition status, and phonation status.

Figure 5:
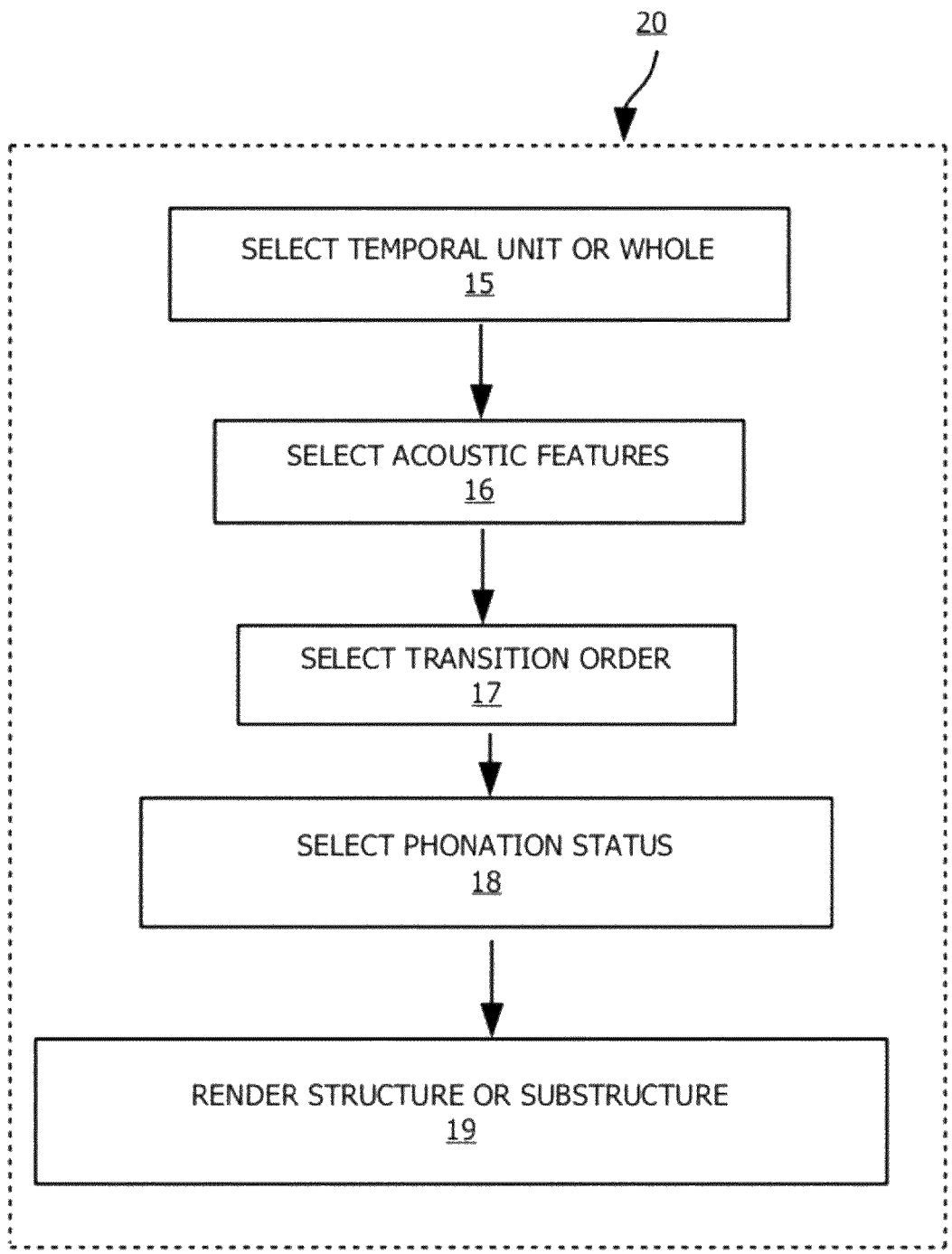
FIG. 5. A flowchart of steps for composing a structure or substructure from selected feature vectors.

Transformational structures and substructures are rendered as shown in FIG. 5. Selections are made of either a temporal unit or the complete utterance STEP 15, of acoustic features STEP 16 to compose the structure or substructure, of primary or secondary transitions STEP 17, and of phonated, unphonated, or whole speech STEP 18. In one embodiment, in which feature vectors have been cataloged according to the steps of STEP 13, the selection is executed by selecting indices that define the desired components of the structure, in a manner understood by persons skilled in the art. For each temporal unit or whole utterance selected, at least two distinct features are selected, identical in their transition and phonation status. The vectors representing each acoustic feature are then concatenated as a single matrix, constituting a transformational structure, S, or, if phonated or unphonated speech is selected, a transformational substructure, S, FIG. 5, STEP 19. For example, in the catalog of 5 feature vectors given above:

S=[catalog{x}(:,ya), catalog{x}(:,yb), catalog{x}(:,yc) . . . ], where x is an integer between 1 and 6, and ya,yb,yc . . . take values from 1 to 5.

Structure S is of size [m,n], with the rows of S corresponding to computations of primary or secondary transformations, and the columns corresponding to the feature values for which those computations are executed.

Each transformational structure or substructure consists of a sequence of data points whose coordinates represent the simultaneous primary or secondary transitions of all acoustic features contained in the structure. The data points may be thought of as being located within a space defined by a number of dimensions equal to the number of acoustic features selected. The location of a data point in any dimension is given by the coordinate corresponding to that dimension.

Figure 6:
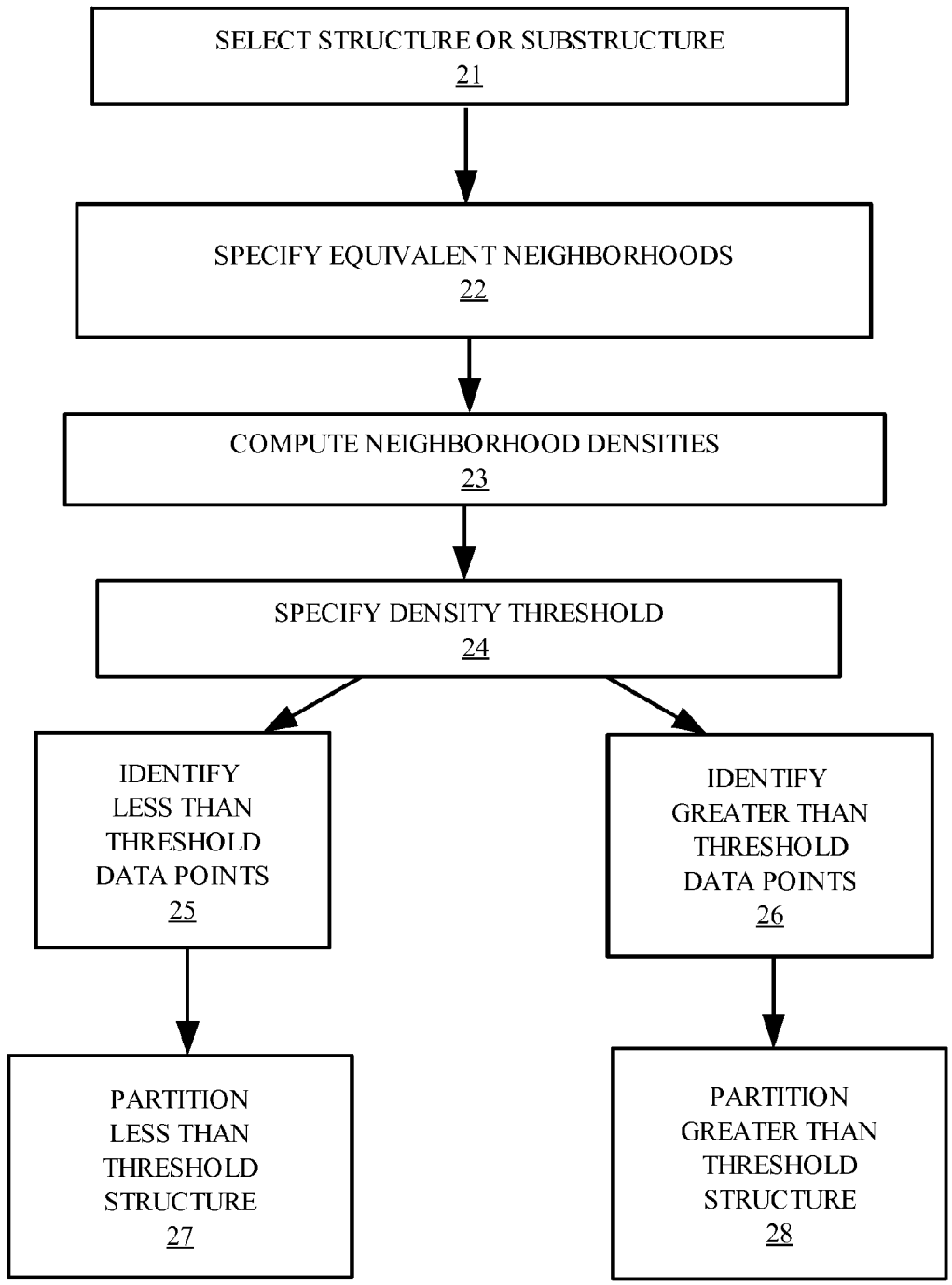
FIG. 6. A flowchart of steps for partitioning a structure or substructure.

FIG. 6 depicts STEPS 21-28 for partitioning a structure or substructure into partitioned structures that are defined by the relative densities of data points within equivalent neighborhoods of the structure or substructure. With these steps, the invention distinguishes a subset of neighborhoods with data point densities greater than a threshold density from a subset of neighborhoods with data point densities less than the threshold density. The data points of these distinct subsets constitute acoustic structures that distinguish those acoustic transformations that a speaker makes most often from those acoustic transformations that the speaker makes less often.

In STEP 21, a structure or substructure is selected for partitioning. In one embodiment in which feature vectors have been cataloged as in the steps of STEP 13, the selection STEP 21 is a repetition of STEPS 15-19, collectively identified as STEP 20. In another embodiment the structure or substructure is selected, STEP 21, from a file for storing structures previously composed.

In FIG. 6, STEP 22, the equivalent neighborhoods of the selected structure or substructure are specified. In one embodiment, equivalent neighborhoods are defined as equivalent volumes in n-dimensional space, where n corresponds to the number of feature vectors comprising the structure. In this embodiment, each coordinate axis of the n-dimensional space represents the axis on which feature vector values for a single feature are located. A suitable range of values is determined for each axis, which is divided into unit intervals. The intersection of each unit interval of each axis with each unit interval of every other axis defines a plurality of equivalent volumes within the structure. These equivalent volumes constitute the equivalent neighborhoods.

To define equivalent volumes a suitable range is first determined for each coordinate axis defining the n-dimensional space. This range is determined in one embodiment by trimming a small percentage of outlying data point values for each coordinate axis and defining the axis range, axis, as two times the maximum of the absolute value of the greatest value, g, and the least value, l, with these commands in the computational software of Matlab:

axis=2*max(abs($g$), abs($l$))

Equivalent unit intervals are then defined as a vector using the linspace function in Matlab:

lin=linspace(−axis/2, axis/2,(int+1)), where int=the desired number of unit intervals.

In one embodiment, the value of int is the same for each axis. Values in the range of 10-100 yield practical results, though other values may be assigned to int.

In this embodiment, a grid,G, of equivalent neighborhoods is constructed using the Matlab meshgrid function, for two or three coordinate axes, or the ndgrid function for three or more coordinate axes. In a structure consisting of specified n acoustic features a,b,c,d . . . , whose corresponding n axes are axisa, axisb, axisc, axisd . . . :

[A,B,C,D . . . ]=ndgrid(-axisa/2:axisa/int:axisa/2,
    -axisb/2:axisb/int:axisb/2, -axisc/2:axisc/int:
    axisc/2, -axisd/2:axisd/int:axisd/2 . . . );

Then, G=[A(:), B(:), C(:), D(:) . . .].

G is an N×n matrix where the columns n correspond to feature values a,b,c,d . . . and the rows N define the coordinates of every possible combination of intersections of coordinate axis unit intervals. N is dependent on the number of columns and the number of unit intervals:

$N=(int+1)^n$.

The number of equivalent volumes within G is given by N−1. Neighborhoods are indexed sequentially in column n+1 of G, where for i=1:N, G(i,n+1)=i, In this embodiment the invention computes neighborhood densities, FIG. 6 STEP 23, by determining the indexed neighborhood into which each data point of structure S, falls and summing the number of data points in that neighborhood. For i=1:N−1, those data points of S whose coordinates fall between rows i and i+1 of G inhabit the same neighborhood. If a data point is determined to lie between rows i and i+1, then the neighborhood population is given by G(i,n+2)=G(i,n+2)+1, where column n+2 of G is the neighborhood population. In this operation the indexed neighborhood into which each data point of S falls is indexed in S, column n+1:

for i=1:N−1, for j=1:n, h=1:m if $S(h,j)>G(i,j) \& S(h,j)<G(i+1,j)$ then G(i,n+2)=G(i,n+2)+1 and S(h, n+1)=i.

In this embodiment, a threshold density is specified FIG. 6, STEP 24, by removing the zero population values of column n+2 in G, and selecting a percentile value of the range of remaining values. In another embodiment, a user of the invention can choose an arbitrary figure between the lowest and highest positive values of G(:,n+2). By either method the threshold value will lie between the minimum positive value of G(:,n+2) and max(G(:,n+2)).

Data points of S that are less than the threshold density are identified in STEP 25, FIG. 6, and data points greater than the threshold density are identified in STEP 26, FIG. 6. In one embodiment:

for i=1:N−1, for h=1:m, if $S(h,n+1)==G(i,n+1) \& G(i,n+2)<$threshold density the data point belongs to the less than threshold subset of data points. The remaining data points belong to the greater or equal than threshold subset.

In STEPS 27 and 28, FIG. 6, the data points belonging to the two subsets are partitioned as distinct matrices and constitute the partitioned structures. These partitioned structures distinguish acoustic transformations made most often by the speaker of the digitized utterance, from acoustic transformations made less often. An example of using partitioned structures in the study of speaker characteristics is given below.

Figure 7:
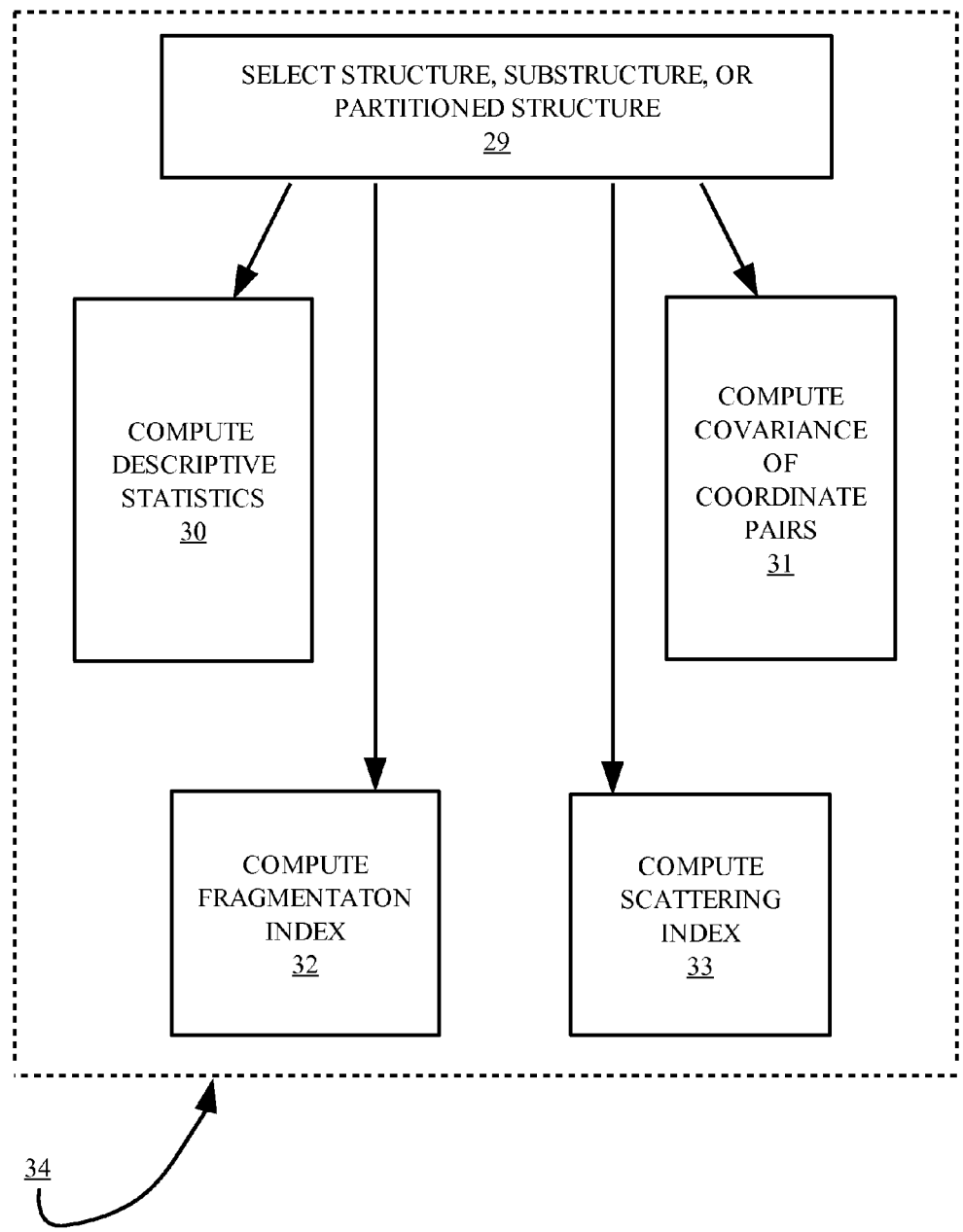
FIG. 7. A flowchart of steps for quantifying a structure, substructure, or partitioned structure.

The invention quantifies aspects of structures, substructures, and partitioned structures. Referring to FIG. 7, a structure, substructure, or partitioned structure is selected and quantified in a series of STEPS 29-33, collectively labelled STEP 34. In STEP 29, a structure, substructure, or partitioned structure is selected. In one embodiment, this may be implemented using the steps for composing a structure, previously defined as STEP 20, and, if a partitioned structure is desired, for partitioning a structure as in STEP 21-28. In another embodiment, a structure, substructure, or partitioned structure may be selected, STEP 29, from a file of previously assembled structures. Descriptive statistics of the distribution of data points representing transitions of any one acoustic feature of the structure are computed, STEP 30. In one embodiment, these statistics include the mean, standard deviation, skew, and kurtosis calculated, for example, in the computational software of Matlab, by the command:

mean(S(:,j)), where S is the structure S and j=1:n for n feature vectors. In another embodiment the median or other statistics may be computed. In one embodiment, the distributions are trimmed prior to the computation of descriptive statistics. In step 31, the covariances of pairs of distributions of acoustic feature transitions are computed. In one embodiment, all possible pairs are computed in a covariance matrix. In another embodiment, specific features are selected for covariance computations. The covariance matrix can be computed in Matlab by:

y=cov(S).

In STEP 32, FIG. 7, a fragmentation index is computed for the selected structure, substructure, or partitioned structure. A fragmentation index pertains to the extent of discontinuity of the structure. In one embodiment, the fragmentation index is computed by measuring the ratio of neighborhoods bordered by empty neighborhoods to neighborhoods bordered by non-empty neighborhoods. In Matlab, this may be computed by:

where G is a matrix of size [N,n+2] of neighborhoods, their indices, and their sizes, for i=2:N−1 if $G(i-1, n+2)==0 \& G(i+1, n+2)==0$ emp=emp+1, where emp is the number of neighborhoods bordered by empty neighborhoods.

Then the number of neighborhoods bordered by non-empty neighborhoods, nemp=N−1−emp., and the fragmentation index=nem/nemp.

In another embodiment, a cluster analysis utilizing a kmeans clustering algorithm is implemented, and the resulting clustering is weighted for cluster density and dispersion. In the computational software of Matlab, this aspect of the invention may be implemented in the following manner:

A kmeans cluster analysis is computed for a range of possible numbers of clusters. A range of clusters between 4 and 9 gives meaningful results for some purposes, and the user of the invention may select another range of possible clusters. A kmeans analysis is performed for each possible number of clusters, and the best clustering of this range is selected by taking a maximum of the mean silhouette values of each clustering:

if rmin=4, r=9,S=matrix of structure, [m,n]=size(S);

for i=rmin:r
    [CLbx, Cbx, sumbx, Dbx]=kmeans(S,i,'distance','euclidean');
    CLx{1,i-rmin+1}=CLbx;
    Cx{1,i-rmin+1}=Cbx;
    sumx{1,i-rmin+1}=sumbx;

```
    Dx{1,i-rmin+1}=Dbx;
    silhx{1,i-rmin+1}=silhouette(x,CLbx);
end
```
where CLbx is a vector indexing the cluster to which each data point belongs, Cbx is a matrix of cluster centroid locations, sumbx is a matrix of within cluster sums of point to centroid distances, Dbx is a matrix of distances of each point to each centroid, and silhouette is an index of how distant each point of a cluster is from neighboring clusters.

Then,
```
for i=1:r-rmin+1
    silhidxx(1,i)=mean(silhx{1,i}(:,1)).
scx=max(silhidxx);
for i=1:r-rmin+1
    if silhidxx(1,i)==scx
        tx=i.
tx+rmin=the best number of clusters.
```

In this embodiment the fragmentation index is computed by selecting the best clustering and comparing the ratio of the mean distance of cluster centroids from each other with the mean distance of points in each cluster from their respective centroid, and weighting this factor for cluster density. The element tx of each array CLx, Cx, sumx, and Dx, represents the kmeans result of the best clustering. The fragmentation index is then calculated by:

Computing the Euclidean distances between all pairs of centroids whose locations are defined by each row of CLx{tx}. There are (tx+rmin−1)*(tx+rmin−2) pairs.

Computing the mean distance of cluster points in each pair of clusters from their respective centroids. Distances of points from each centroid are given in Dbx, and centroid membership of each data point is given by the vector, CLbx.

Dividing the computed distance between each pair of clusters by the computed mean distance of cluster points from their respective centroids in that pair.

Multiplying this result for each pair of clusters by the fraction of total data points of the structure contained in that pair, to yield a value, frag, for each pair, and a vector Frag, consisting of the frag values for the structure.

The fragmentation index=mean(Frag(:)). A higher fragmentation index implies greater discontinuity in the transformational structure.

Referring to FIG. 7, STEP 33, the invention computes an index of scattering for each transformational structure. In one embodiment, scattering is defined as the ratio of the number of data points lying beyond a specified perimeter from the center of the structure to the number of data points within the specified perimeter. In this embodiment, the perimeter is defined as the Euclidean distance of a specified number of standard deviations from the means of coordinate axes. For example, if the perimeter is defined as the length of 2 standard deviations along every coordinate axis, the scattering index is computed in the computational software of Matlab by:

Where [m,n] is the size of structure, S, composed of n feature values, stdS is a standard deviation vector of S, mnS is a vector of trimmed means, sx is the number of data points lying beyond the perimeter and nsx is the number of data points lying within the perimeter,
```
sx=[0]
nsx=[0]
for i=1:n, for j=1:m
    sqx(j,i)=(S(j,i)−mnS(i)).^2.
dx=sqrt(sum(sqx,2))
for j=1:m
    if dx(j)>sqrt((sum((stdS.*2).^2,2))
        sx=sx+1
    else nsx=nsc+1.
scatter index=sx/nsx.
```

In another embodiment the scattering index may be defined as a feature kurtosis value, or a combination of feature kurtosis values, exceeding a certain value. In still another embodiment, the scattering index may be as identical with standard deviation or a combination of standard deviations.

Transformational structures and quantifications are displayed by the invention using the display monitor FIG. 2, ELEMENT 06 and display software, FIG. 1, ELEMENT 04. Factory installed display software and a factory installed display monitor contained in a commercially available desktop or laptop computer suitable for home use are sufficient to implement the steps of displaying an image of a structure, FIG. 8, STEP 35, displaying the quantifications of a structure, FIG. 11, STEP 40, and for displaying as a movie the images of structures corresponding to sequential temporal units, FIG. 10, STEP 39.

In one embodiment of the display of quantifications, calculations of descriptive statistics, covariances, fragmentation indices, and scatter indices are displayed numerically as a single table. In another embodiment, quantifications are displayed singly or in various combinations. In a still further embodiment, quantifications are displayed graphically.

Figure 8:
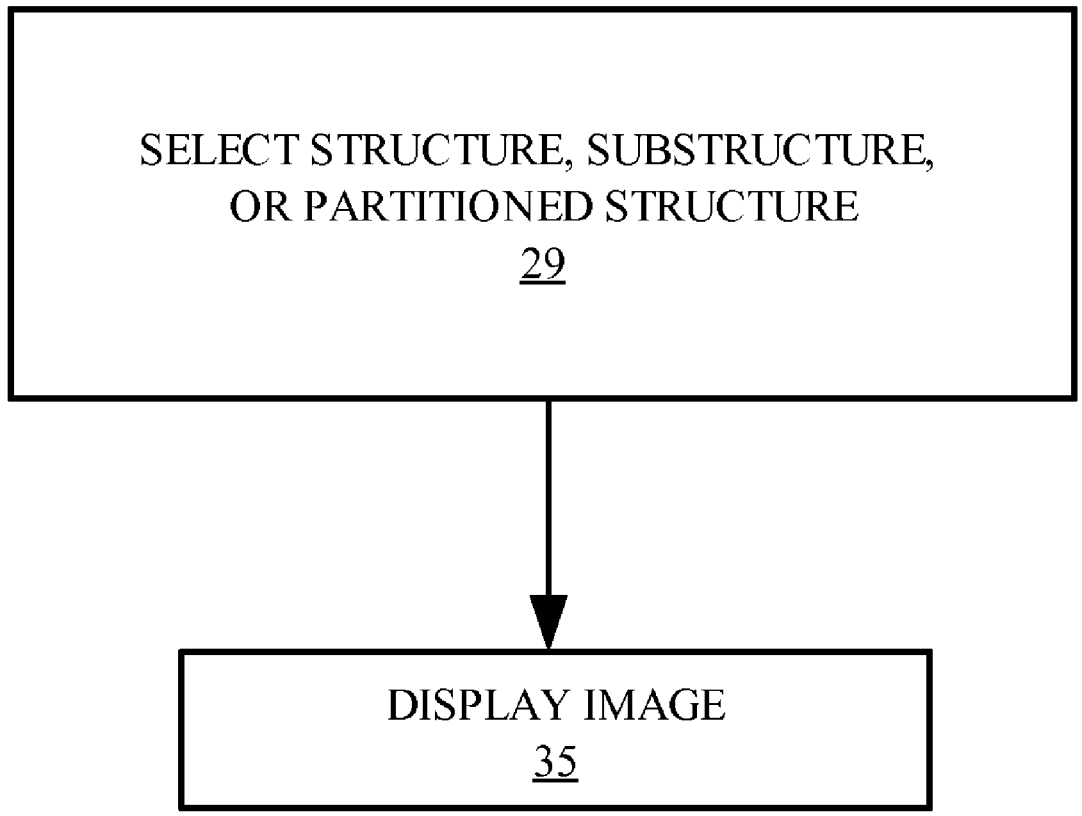
FIG. 8. A flowchart of steps for displaying a structure, substructure, or partitioned structure.

FIG. 8, STEP 35, a structure, substructure, or partitioned structure that has been selected, STEP 29, is displayed as an image. In one embodiment, a graphical image representing a transformational structure of two acoustic features is displayed. In this embodiment, the two axes of the graph represent the range of each feature, and the relative densities of data points lying within equivalent neighborhoods is determined as in FIG. 6, STEP 22 and STEP 23, described above. In the computational software of Matlab, the matrix, G, containing the densities of data points within neighborhoods may be reshaped according to the generated meshgrid and displayed as a pseudocolor plot, as follow:
```
[A,B]=meshgrid(−axisa/2:axisa/int:axisa/2,−axisb/2:ax-
    isb/int:axisb), where
A,B,axisa,axib, and int are defined as above.
R=reshape(G(:,n+1),size(A))
pcolor(axes2,A,B,R)
```

Figure 9A:
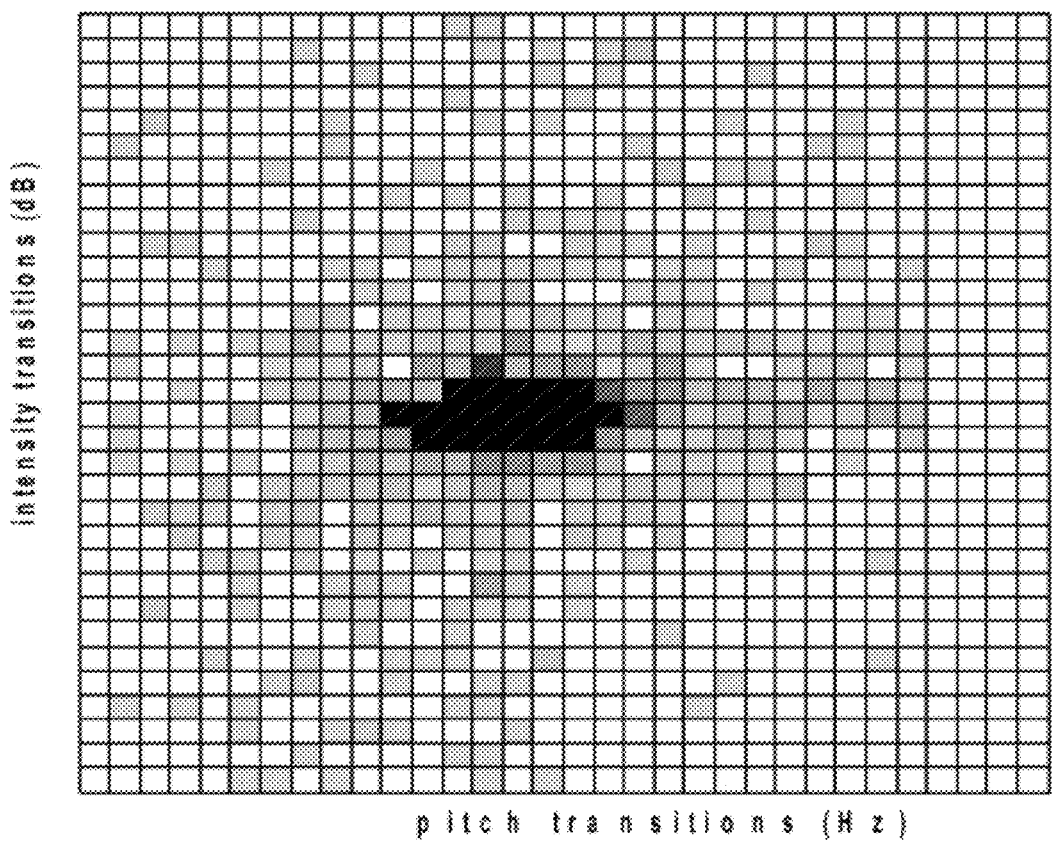
FIG. 9a. An image of a primary, two feature, unpartitioned structure.
Figure 9B:
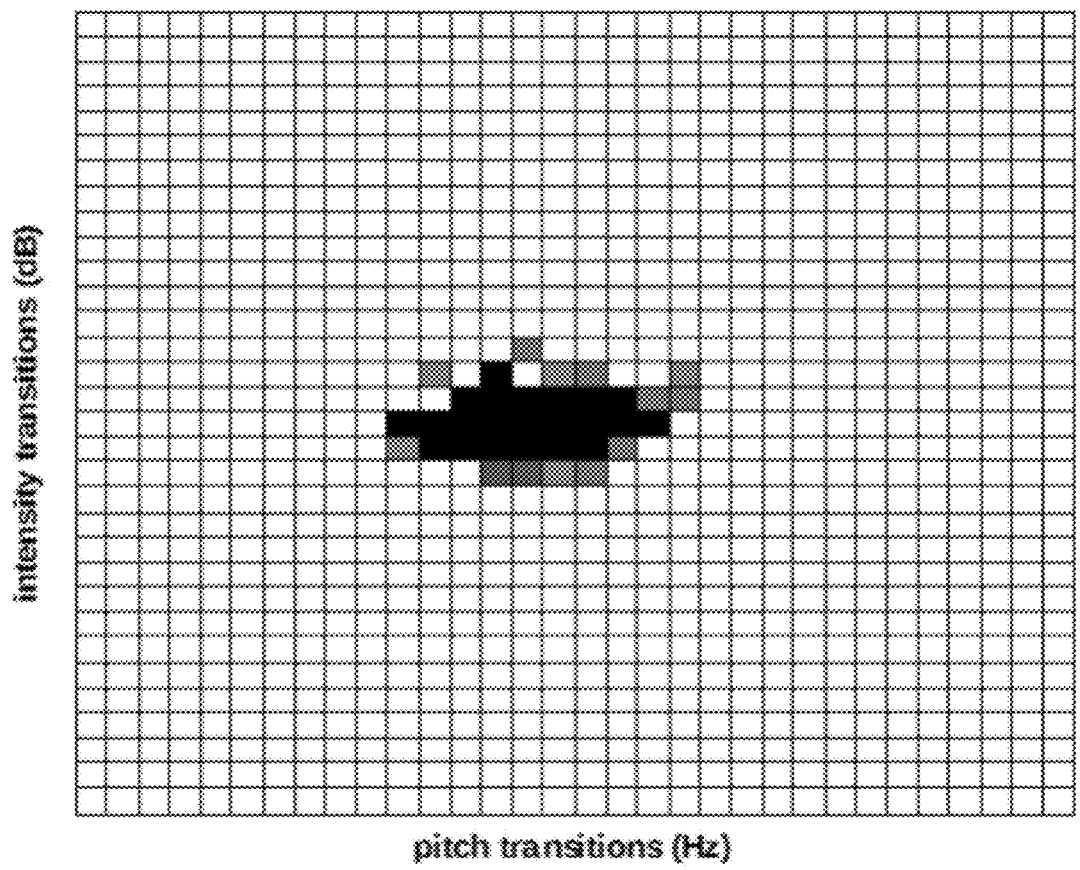
Figure 9C:
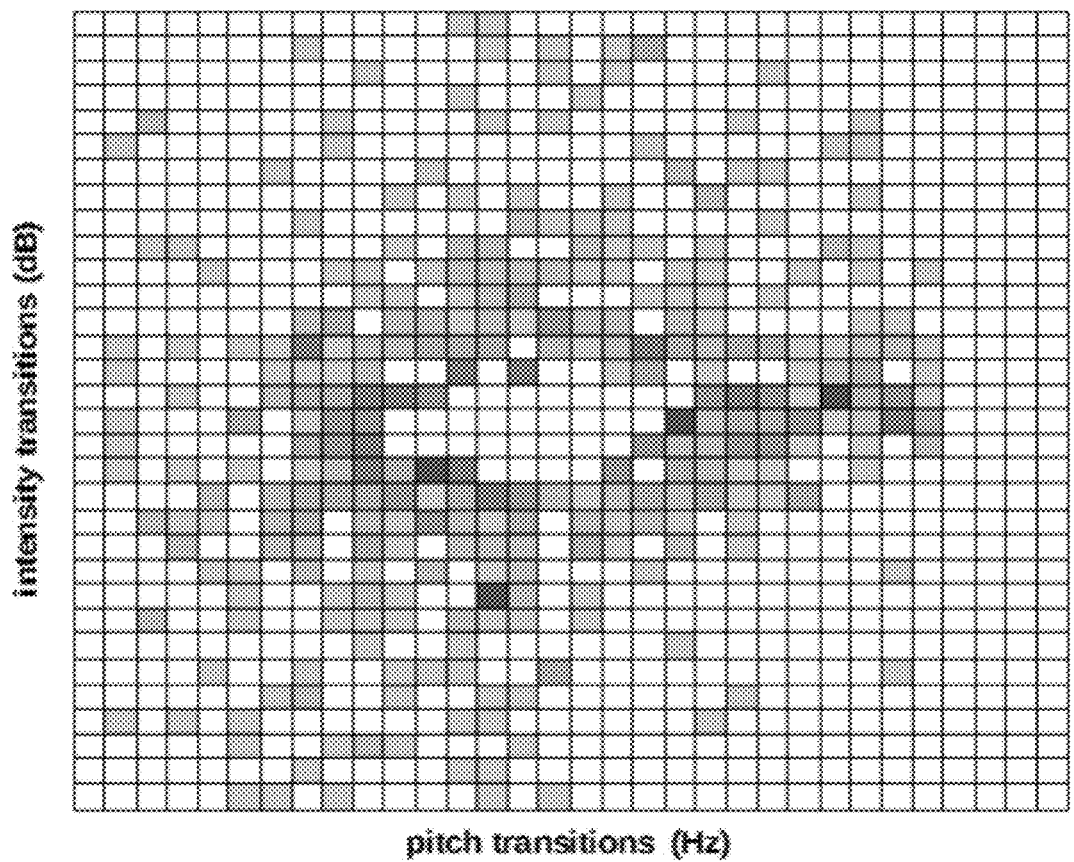

The pseudocolor plot is easily interpreted for a rapid intuitive understanding of a structure. FIG. 9a, FIG. 9b, and FIG. 9c depict pseudocolor plots of a two dimensional, primary transformational structure in unpartitioned and partitioned forms. Because the figures of this application are in rendered in grayscale, the colors show up as intensities of gray. In addition, some of the peripheral values of the image of the whole structure are relatively faint compared with their images in the less-than partitioned structure. This is because the densities of the partitioned structure are depicted relative to other densities in that structure only.

In another embodiment, a structure, substructure, or partitioned structure of two features is displayed as a surface plot. In Matlab, this may be implemented using the surf function:
```
surf(S), or, to specify the length of axes, surf(axisa,axib,S).
```

In another embodiment, a structure of more than two features, S, may be displayed as a histogram, using the Matlab command, hist(S).

Figure 10:
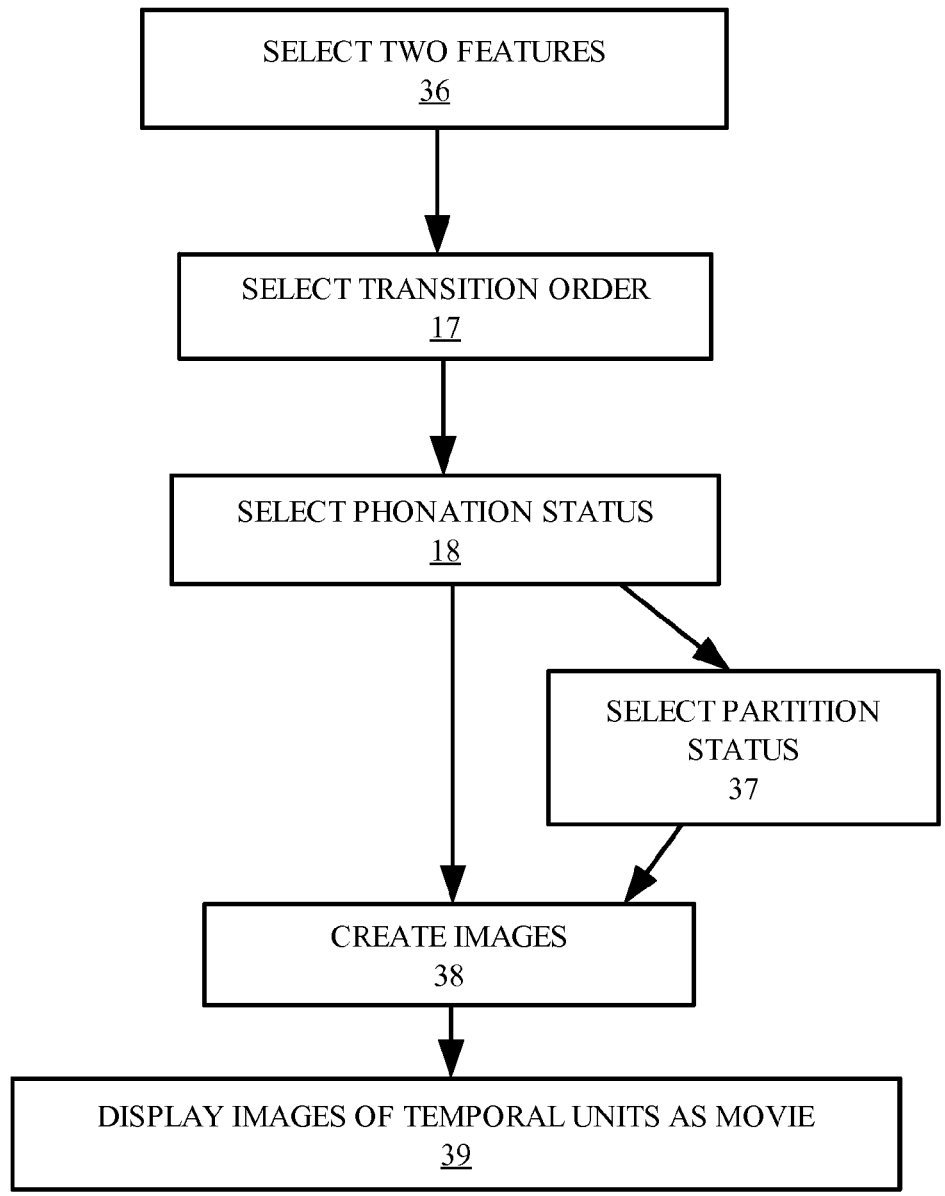
FIG. 10. A flowchart of steps for displaying as a movie images derived from temporal units.
Figure 11:
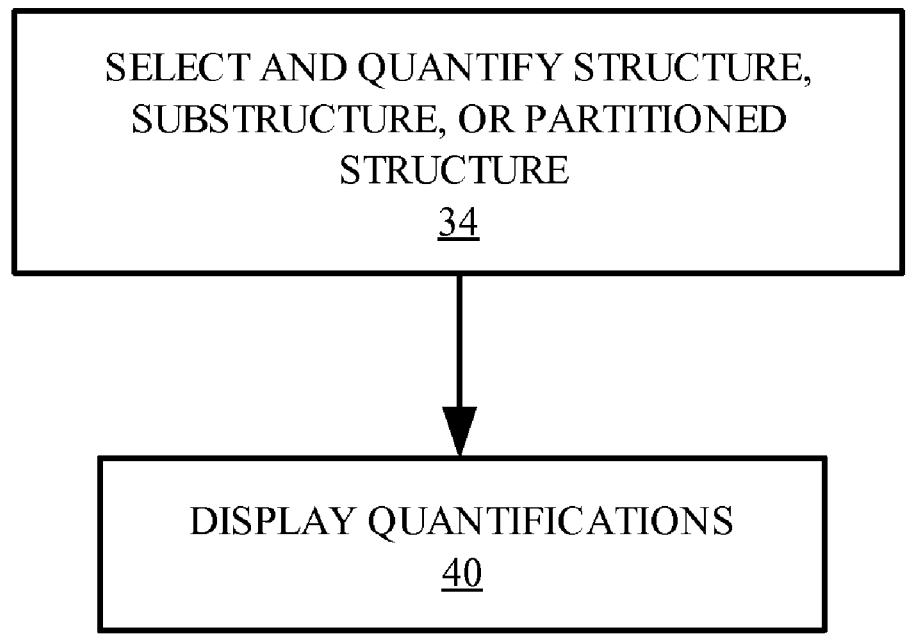
FIG. 11. A flowchart of steps for displaying quantifications of a structure, substructure, or partitioned structure.

Referring to FIG. 10, the invention displays as a movie, STEP 39, graphical images of transformational structures derived from sequential temporal units of the utterance in order and at a rate corresponding to the duration of the temporal units. In FIG. 10, STEP 36, two features are selected. In one embodiment this is accomplished by accessing corresponding indices of the feature vector catalog. Transition order and phonation status are selected as previously described in STEP 17 and STEP 18. The user decides whether to view partitioned less-than or greater-than structures, or unpartitioned structures, FIG. 10, STEP 37. A series of images representing the structures of sequential temporal units are created, STEP 38, by repeating STEP 35, for each temporal unit. In one embodiment, using the computational software of Matlab, these images are assembled into an array using the "getframe" function, and the resulting sequence of images is then be shown as a movie using the "movie" function, at a rate corresponding to the rate of the temporal units of utterance from which the images derive. For example, the commands for i=1:ims
    plotimage(a,b);
    F(l)=getframe(gcf).

create an array of images, F, consisting of ims images, corresponding to images of the ims transformational structures of the structure S consisting of vector variables a and b of the utterance sliced into ims units. F is then displayed as a movie with the command:

movie(F, fps), where fps frames per second corresponds to the number of temporal units per second.

In one embodiment, the movie may be run simultaneously with an audio rendition of the digitized speech utterance, enabling the user to compare a visual representation of the acoustic transformations with an audible sound of the speech itself.

The ability to display images of transformational structures and quantifications of transformational structures facilitates the use of the invention for investigational purposes. The visual inspection of transformational structures makes it possible to explore trends and intuitions rapidly, while inspection of arrays of the quantifications of transformational structures facilitates the generating and testing of useful hypotheses.

Figure 12:
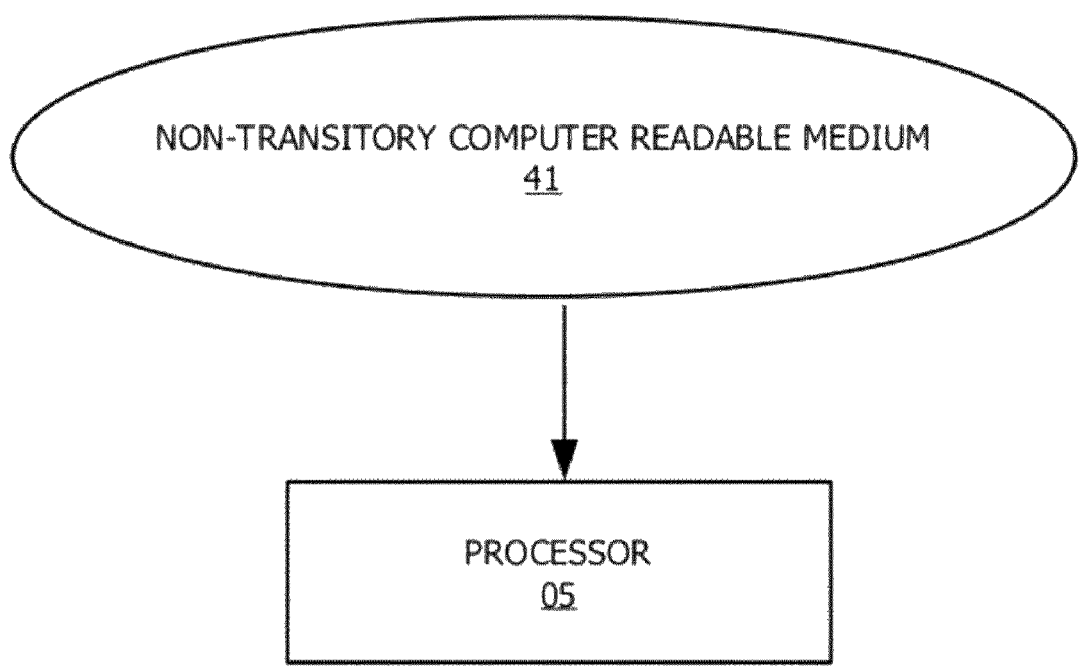
FIG. 12. A schematic diagram depicting a non-transitory computer readable medium and a processor.

The invention further comprises a non-transitory computer readable medium, FIG. 12, ELEMENT 41, with computer readable instructions for executing with a processor the method and system of the invention described in this section.

An example of use of the invention:

The invention may be used as a means of assessing the response of a cohort of psychiatric patients to antidepressant medications. For example, eighteen depressed subjects in treatment were assessed on two occasions, the first at their initial visit prior to starting treatment, and subsequently when their depression was deemed by themselves and their clinician to have lifted to a significant extent. Utterances of approximately twenty seconds of spontaneous speech were recorded and digitized. The utterances were analyzed according to the methods and system of the invention, wherein transformational structures were identified and quantified. Fragmentation indices were computed by means of the embodiment based on kmeans clustering, for the greater-than partitioned, first-order transformational structures of vocalized speech. A Lilliefors test of pre- and post-treatment fragmentation indices of persons recovering from depression determined that the distribution of each set of indices was normal. Means and standard deviations are shown below. A t-test was significant with a type I error probability of p=<0.001.

Group: Depressed, Recovered
    normality: yes, yes
    means: 0.47, 0.42
    std: 0.06 ,0.05
    t test of fragmentations indices, depressed and recovered:
    significant, p=0.001
    Effect Size d=0.91

This example demonstrates how the invention can be used in the study of the response of patients to treatment for depression.

I claim:

1. A method for identifying a primary transformational structure in human speech, the method comprising: a) computing using a processor the values of at least two acoustic features of a digitized utterance at a plurality of equal periodic intervals throughout the digitized utterance, b) computing using a processor transitions between successive computed values of the at least two acoustic features of the digitized utterance at the plurality of equal periodic intervals throughout the digitized utterance, c) selecting using a processor those of the computations of the transitions between the successive computed values that derive from spoken portions of the digitized utterance, and d) rendering using a processor a primary transformational structure by juxtaposing the selected computations of the transitions between the successive computed values of at least two of the at least two acoustic features, wherein the primary transformational structure contains a temporal sequence of data points, each data point of which is defined by at least two values corresponding to the at least two of the at least two acoustic features, describing the simultaneous transitions of the at least two of the at least two acoustic features at the plurality of equal periodic intervals of the spoken portions of the digitized utterance.

2. The method of claim 1, wherein a secondary transformational structure of the digitized utterance is identified, the method further comprising a) computing using a processor rates of change between the successive computed values of the at least two acoustic features of the digitized utterance, b) selecting using a processor those computations of the rates of change between the successive computed values that derive from spoken portions of the digitized utterance, and c) rendering using a processor a secondary transformational structure by juxtaposing the selected computations of the rates of change of the successive computed values of at least two of the at least two acoustic features, wherein the secondary transformational structure contains a temporal sequence of data points, each data point of which is defined by at least two values corresponding to the at least two of the at least two acoustic features, describing the simultaneous rates of change of the at least two of the at least two acoustic features at the plurality of equal periodic intervals of the spoken portions of the digitized utterance.

3. The method of claim 2, wherein substructures of one of the primary transformational structure or the secondary transformational structure are identified, the method further comprising, a) selecting using a processor one of the primary transformational structure or the secondary transformational structure, b) identifying using a processor i) the data points contained in the selected primary transformational structure or the selected secondary transformational structure that derive from phonated portions of the digitized utterance, and ii) the data points contained in the selected primary transformational structure or the selected secondary transformational structure that derive from unphonated portions of the digitized utterance, c) rendering using a processor a transformational substructure containing only the identified data points that derive from the phonated portions of the digitized utterance, and d) rendering using a processor a transformational substructure containing only the identified data points that derive from the unphonated portions of the digitized utterance.

4. The method of claim 3, wherein at least one of the primary transformational structure, the secondary transformational structure, or one of the substructures that derive from a temporal unit of the digitized utterance is identified, the method further comprising, a) subdividing using a processor the digitized utterance into temporal units of equal duration, b) computing using a processor for at least one of the temporal units of equal duration at least one of the primary transformational structure, the secondary transformational structure, or one of the substructures.

5. The method of claim 4, wherein one of the primary transformational structure, the secondary transformational structure, or one of the substructures of the digitized utterance or of the temporal units of the digitized utterance is partitioned, the method further comprising a) selecting using a processor one of the primary transformational structure, the secondary transformational structure, or one of the substructures that derive from the digitized utterance or from the temporal units of the digitized utterance, b) computing using a processor a plurality of equivalent neighborhoods within the selected primary transformational structure, the selected secondary transformational structure, or the selected substructure, c) computing using a processor the number of the data points of the selected primary transformational structure, the selected secondary transformational structure, or the selected substructure lying within each of the plurality of equivalent neighborhoods, d) specifying using a processor a threshold density, e) identifying with a computer i) a subset of the plurality of equivalent neighborhoods consisting of those neighborhoods that contain a density of the data points greater than the threshold density, and ii) a subset of the plurality of equivalent neighborhoods consisting of those neighborhoods that contain a density of the data points less than the threshold density, f) partitioning using a processor the selected primary transformational structure, the selected secondary transformational structure, or the selected substructure into partitioned structures consisting of i) the subset of data points lying within the identified subset of the plurality of equivalent neighborhoods consisting of those neighborhoods that contain a density of data points greater than the threshold density, and ii) the subset of data points lying within the identified subset of the plurality of equivalent neighborhoods consisting of those neighborhoods that contain a density of data points less than the threshold density.

6. The method of claim 5, wherein one of the primary transformational structure, the secondary transformational structure, one of the substructures, or one of the partitioned structures is quantified, the method further comprising, a) selecting using a processor one of the primary transformational structure, the secondary transformational structure, one of the substructures, or one of the partitioned structures that derive from the digitized utterance or from the temporal units of the digitized utterance, b) computing using a processor a fragmentation index of the selected primary transformational structure, the selected secondary transformational structure, the selected substructure, or the selected partitioned structure, c) computing using a processor a scattering index of the selected primary transformational structure, the selected secondary transformational structure, the selected substructure, or the selected partitioned structure, d) computing using a processor descriptive statistics of at least one of the at least two acoustic features contained in the selected primary transformational structure, the selected secondary transformational structure, the selected substructure, or the selected partitioned structure, and e) computing using a processor the covariance for at least one pair of the at least two acoustic features contained in the selected primary transformational structure, the selected secondary transformational structure, the selected substructure, or the selected partitioned structure.

7. A system for identifying a primary transformational structure in human speech, the system comprising: a) a processor for receiving a digitized utterance, b) a processor for computing the values of at least two acoustic features of the digitized utterance at a plurality of equal periodic intervals throughout the digitized utterance, c) a processor for computing transitions between successive computed values of the at least two acoustic features of the digitized utterance at the plurality of equal periodic intervals throughout the digitized utterance, d) a processor for selecting those computations of the transitions between the successive computed values that derive from spoken portions of the digitized utterance, and e) a processor for rendering a primary transformational structure by juxtaposing the selected computations of the transitions between the successive computed values of at least two of the at least two acoustic features, wherein the primary transformational structure contains a temporal sequence of data points, each data point of which is defined by at least two values corresponding to the at least two of the at least two acoustic features, describing the simultaneous transitions of the at least two of the at least two acoustic features at the plurality of equal periodic intervals of the spoken portions of the digitized utterance.

8. The system of claim 7, wherein a secondary transformational structure of the digitized utterance is identified, the system further comprising a) a processor for computing rates of change between the successive computed values of the at least two acoustic features of the digitized utterance, b) a processor for selecting those computations of the rates of change between the successive computed values that derive from spoken portions of the digitized utterance, and c) a processor for rendering a secondary transformational structure by juxtaposing the selected computations of the rates of change of the successive computed values of at least two of the at least two acoustic features, wherein the secondary transformational structure contains a temporal sequence of data points, each data point of which is defined by at least two values corresponding to at least two of the at least two acoustic features, describing the simultaneous rates of change of the at least two of the at least two acoustic features at the plurality of equal periodic intervals of the spoken portions of the digitized utterance.

9. The system of claim 8, wherein substructures of one of the primary transformational structure or the secondary transformational structure are identified, the system further comprising, a) a processor for selecting one of the primary transformational structure or the secondary transformational structure, b) a processor for identifying i) the data points contained in the selected primary transformational structure or the selected secondary transformational structure that derive from phonated portions of the digitized utterance, and ii) the data points contained in the selected primary transformational structure or the selected secondary transformational structure that derive from unphonated portions of the digitized utterance, c) a processor for rendering a transformational substructure containing only the identified data points that derive from the phonated portions of the digitized utterance, and d) a processor for composing a transformational substructure containing only the identified data points that derive from the unphonated portions of the digitized utterance.

10. The system of claim 9, wherein at least one of the primary transformational structure, the secondary transformational structure, or one of the substructures that derive from a temporal unit of the digitized utterance is identified, the system further comprising, a) a processor for subdividing the digitized utterance into temporal units of equal duration, b) a processor for computing for at least one of the temporal units of equal duration at least one of the primary transformational structure, the secondary transformational structure, or one of the substructures.

11. The system of claim 10, wherein one of the primary transformational structure, the secondary transformational structure, or one of the substructures of the digitized utterance or of the temporal units of the digitized utterance is partitioned, the system further comprising a) a processor for selecting one of the primary transformational structure, the secondary transformational structure, or one of the substructures that derive from the digitized utterance or from the temporal units of the digitized utterance, b) a processor for computing a plurality of equivalent neighborhoods within the selected primary transformational structure, the selected secondary transformational structure, or the selected substructure, c) a processor for computing the number of the data points of the selected primary transformational structure, the selected secondary transformational structure, or the selected substructure lying within each of the plurality of equivalent neighborhoods, d) a processor for specifying a threshold density, e) a processor for identifying i) a subset of the plurality of equivalent neighborhoods consisting of those neighborhoods that contain a density of the data points greater than the threshold density, and ii) a subset of the plurality of equivalent neighborhoods consisting of those neighborhoods that contain a density of the data points less than the threshold density, f) a processor for partitioning the selected primary transformational structure, the selected secondary transformational structure, or the selected substructure into partitioned structures consisting of i) the subset of data points lying within the identified subset of the plurality of equivalent neighborhoods consisting of those neighborhoods that contain a density of data points greater than the threshold density, and ii) the subset of data points lying within the identified subset of the plurality of equivalent neighborhoods consisting of those neighborhoods that contain a density of data points less than the threshold density.

12. The system of claim 11, wherein one of the primary transformational structure, the secondary transformational structure, one of the substructures, or one of the partitioned structures is quantified, the system further comprising, a) a processor for selecting at least one of the primary transformational structure, the secondary transformational structure, one of the substructures, or one of the partitioned structures that derive from the digitized utterance or from the temporal units of the digitized utterance, b) a processor for computing a fragmentation index of the selected primary transformational structure, the selected secondary transformational structure, the selected substructure, or the selected partitioned structure, c) a processor for computing a scattering index of the selected primary transformational structure, the selected secondary transformational structure, the selected substructure, or the selected partitioned structure, d) a processor for computing descriptive statistics of at least one of the at least two acoustic features contained in the selected primary transformational structure, the selected secondary transformational structure, the selected substructure, or the selected partitioned structure, and e) a processor for computing the covariance for at least one pair of the at least two acoustic features contained in the selected primary transformational structure, the selected secondary transformational structure, the selected substructure, or the selected partitioned structure.

13. The system of claim 11, wherein one of the primary transformational structure, the secondary transformational structure, one of the substructures, or one of the partitioned structures is displayed as an image, the system further comprising, a) a processor for selecting one of the primary transformational structure, the secondary transformational structure, one of the substructures, or one of the partitioned structures that derive from the digitized utterance or from the temporal units of the digitized utterance, b) a processor for displaying as an image the selected primary transformational structure, the selected secondary transformational structure, the selected substructure, or the selected partitioned structure.

14. The system of claim 13, wherein a sequence of the images corresponding to a sequence of the temporal units of the digitized utterance are displayed as a movie, the system further comprising a) a processor for selecting a sequence of the temporal units of the digitized utterance, b) a processor for selecting for display a single type of transformational structure from among the primary transformational structure, the secondary transformational structure, one of the substructures, or one of the partitioned structures, c) a processor for selecting the sequence of the images of the selected single type of transformational structure corresponding to the selected sequence of temporal units, b) a processor for displaying the selected sequence of the images at a rate corresponding to the sequence of the temporal units.

15. The system of claim 12, wherein at least one of the computed quantifications of one of the primary transformational structure, the secondary transformational structure, one of the substructures, or one of the partitioned structures is displayed, the system further comprising, a) a processor for selecting one of the primary transformational structure, the secondary transformational structure, one of the substructures, or one of the partitioned structures that derive from the digitized utterance or from temporal units of the digitized utterance, b) a processor for displaying at least one of the computed fragmentation index, the computed scattering index, the computed descriptive statistics, or the computed covariance for the selected primary transformational structure, the selected secondary transformational structure, the selected substructure, or the selected partitioned structure.

16. A non-transitory computer readable medium having stored therein computer readable instructions which when executed cause a computer to perform a set of operations for identifying a primary transformational structure in human speech, the set of operations comprising: a) computing the values of at least two acoustic features of a digitized utterance at a plurality of equal periodic intervals throughout the digitized utterance, b) computing transitions between successive computed values of the at least two acoustic features of the digitized utterance at the plurality of equal periodic intervals throughout the digitized utterance, c) selecting those of the computations of the transitions between the successive computed values that derive from spoken portions of the digitized utterance, and d) rendering a primary transformational structure by juxtaposing the selected computations of the transitions between the successive computed values of at least two of the at least two acoustic features, wherein the primary transformational structure contains a temporal sequence of data points, each data point of which is defined by at least two values corresponding to the at least two of the at least two acoustic features, describing the simultaneous transitions of the at least two of the at least two acoustic features at the plurality of equal periodic intervals of the spoken portions of the digitized utterance.

17. The non-transitory computer readable medium of claim 16, wherein a secondary transformational structure of the digitized utterance is identified, the computer readable instructions further comprising a) computing rates of change between the successive computed values of the at least two acoustic features of the digitized utterance, b) selecting those computations of the rates of change between the successive computed values that derive from spoken portions of the digitized utterance, and c) rendering a secondary transformational structure by juxtaposing the selected computations of the rates of change of the successive computed values of at least two of the at least two acoustic features, wherein the secondary transformational structure contains a temporal sequence of data points, each data point of which is defined by at least two values corresponding to the at least two of the at least two acoustic features, describing the simultaneous rates of change of the at least two of the at least two acoustic features at the plurality of equal periodic intervals of the spoken portions of the digitized utterance.

18. The non-transitory computer readable medium of claim 16, wherein substructures of one of the primary transformational structures or the secondary transformational structures are identified, the computer readable instructions further comprising, a) selecting one of the primary transformational structure or the secondary transformational structure, b) identifying i) the data points contained in the selected primary transformational structure or the selected secondary transformational structure that derive from phonated portions of the digitized utterance, and ii) the data points contained in the selected primary transformational structure or the selected secondary transformational structure that derive from unphonated portions of the digitized utterance, c) rendering a transformational substructure containing only the identified data points that derive from the phonated portions of the digitized utterance, and d) rendering a transformational substructure containing only the identified data points that derive from the unphonated portions of the digitized utterance.

19. The non-transitory computer readable medium of claim 16, wherein at least one of the primary transformational structure, the secondary transformational structure, or one of the substructures that derive from a temporal unit of the digitized utterance is identified, the computer readable instructions further comprising, a) subdividing the digitized utterance into temporal units of equal duration, b) computing for at least one of the temporal units of equal duration at least one of the primary transformational structure, the secondary transformational structure, or one of the substructures.

20. The non-transitory computer readable medium of claim 16, wherein one of the primary transformational structure, the secondary transformational structure, or one of the substructures of the digitized utterance or of the temporal units of the digitized utterance is partitioned, the computer readable instructions further comprising a) selecting one of the primary transformational structure, the secondary transformational structure, or one of the substructures that derive from the digitized utterance or from the temporal units of the digitized utterance, b) computing a plurality of equivalent neighborhoods within the selected primary transformational structure, the selected secondary transformational structure, or the selected substructure, c) computing the number of the data points of the selected primary transformational structure, the selected secondary transformational structure, or the selected substructure lying within each of the plurality of equivalent neighborhoods, d) specifying a threshold density, e) identifying i) a subset of the plurality of equivalent neighborhoods consisting of those neighborhoods that contain a density of the data points greater than a threshold density, and ii) a subset of the plurality of equivalent neighborhoods consisting of those neighborhoods that contain a density of the data points less than the threshold density, f) partitioning the selected primary transformational structure, the selected secondary transformational structure, or the selected substructure into partitioned structures consisting of i) the subset of data points lying within the identified subset of the plurality of equivalent neighborhoods consisting of those neighborhoods that contain a density of data points greater than the threshold density, and ii) the subset of data points lying within the identified subset of the plurality of equivalent neighborhoods consisting of those neighborhoods that contain a density of data points less than the threshold density.

21. The non-transitory computer readable medium of claim 16, wherein at one of the primary transformational structure, the secondary transformational structure, one of the substructures, or one of the partitioned structures is quantified, the computer readable instructions further comprising, a) selecting one of the primary transformational structure, the secondary transformational structure, one of the substructures, or one of the partitioned structures that derive from the digitized utterance or from the temporal units of the digitized utterance, b) computing a fragmentation index of the selected primary transformational structure, the selected secondary transformational structure, the selected substructure, or the selected partitioned structure, c) computing a scattering index of the selected primary transformational structure, the selected secondary transformational structure, the selected substructure, or the selected partitioned structure, d) computing descriptive statistics of at least one of the at least two acoustic features contained in the selected primary transformational structure, the selected secondary transformational structure, the selected substructure, or the selected partitioned structure, and e) computing the covariance for at least one pair of the at least two acoustic features contained in the selected primary transformational structure, the selected secondary transformational structure, the selected substructure, or the selected partitioned structure.

22. The non-transitory computer readable medium of claim 16, wherein one of the primary transformational structure, the secondary transformational structure, one of the substructures, or one of the partitioned structures is displayed as an image, the computer readable instructions further comprising, a) selecting one of the primary transformational structure, the secondary transformational structure, one of the substructures, or one of the partitioned structures, b) displaying as an image the selected primary transformational structure, the selected secondary transformational structure, the selected substructure, or the selected partitioned structure.

23. The non-transitory computer readable medium of claim 16, wherein a sequence of the images corresponding to a sequence of the temporal units of the digitized utterance are displayed as a movie, the computer readable instructions further comprising a) selecting a sequence of the temporal units of the digitized utterance, b) selecting a single type of transformational structure for display from among the primary transformational structure, the secondary transformational structure, one of the substructures, or one of the partitioned structures, c) selecting the sequence of the images of the selected single type of transformational structure corresponding to the selected sequence of temporal units, d) displaying the selected sequence of the images at a rate corresponding to the sequence of the temporal units.

24. The non-transitory computer readable medium of claim 16, wherein at least one of the computed quantifications of one of the primary transformational structure, the secondary transformational structure, one of the substructures, or one of the partitioned structures is displayed, the computer readable instructions further comprising, a) selecting one of the primary transformational structure, the secondary transformational structure, one of the substructures, or one of the partitioned structures that derive from the digitized utterance or from the temporal units of the digitized utterance, b) displaying at least one of the computed fragmentation index, the computed scattering index, the computed descriptive statistics, or the computed covariance for the selected primary transformational structure, the selected secondary transformational structure, the selected substructure, or the selected partitioned structure.

* * * * *